US008228656B2

(12) United States Patent
Kauffman

(10) Patent No.: US 8,228,656 B2
(45) Date of Patent: Jul. 24, 2012

(54) PROTECTIVE DEVICE FOR A RADIO FREQUENCY TRANSMISSION LINE

(76) Inventor: George M. Kauffman, Hudson, MA (US)

( * ) Notice: Subject to any disclaimer, the term of this patent is extended or adjusted under 35 U.S.C. 154(b) by 830 days.

(21) Appl. No.: 12/283,523

(22) Filed: Sep. 12, 2008

(65) Prior Publication Data

US 2011/0128660 A1 Jun. 2, 2011

Related U.S. Application Data

(60) Provisional application No. 60/993,431, filed on Sep. 12, 2007.

(51) Int. Cl.
*H02H 9/04* (2006.01)

(52) U.S. Cl. ........................................................ 361/118

(58) Field of Classification Search .................. 361/118, 361/54

See application file for complete search history.

(56) References Cited

U.S. PATENT DOCUMENTS

| | | | | |
|---|---|---|---|---|
| 2,828,447 | A | 3/1958 | Mauchly | |
| 3,193,779 | A | 7/1965 | Beaty | |
| 3,230,316 | A | 1/1966 | Hunt | |
| 4,142,220 | A | 2/1979 | Lundsgaard | |
| 4,359,764 | A * | 11/1982 | Block | 361/119 |
| 4,389,624 | A | 6/1983 | Aihara et al. | |
| 4,554,608 | A | 11/1985 | Block | |
| 4,633,359 | A * | 12/1986 | Mickelson et al. | 361/119 |
| 4,912,589 | A | 3/1990 | Stolarczyk | |
| 5,712,755 | A | 1/1998 | Glaser et al. | |
| 5,953,195 | A | 9/1999 | Pagliuca | |
| 5,982,602 | A | 11/1999 | Tellas et al. | |
| 6,061,223 | A | 5/2000 | Jones et al. | |
| 6,115,227 | A | 9/2000 | Jones et al. | |
| 6,236,551 | B1 | 5/2001 | Jones et al. | |
| 6,529,357 | B1 | 3/2003 | Landinger et al. | |
| 6,606,232 | B1 * | 8/2003 | Vo et al. | 361/119 |
| 6,636,407 | B1 | 10/2003 | Ryman | |
| 6,754,060 | B2 | 6/2004 | Kauffman | |
| 2004/0100743 | A1 * | 5/2004 | Vo | 361/54 |
| 2004/0169986 | A1 * | 9/2004 | Kauffman | 361/119 |

* cited by examiner

*Primary Examiner* — Rexford Barnie
*Assistant Examiner* — Angela Brooks
(74) *Attorney, Agent, or Firm* — Kriegsman & Kriegsman

(57) ABSTRACT

A device for protecting a radio frequency transmission line from transient voltages includes an inner conductor for transmitting electromagnetic signals of a desired frequency band and a grounded, coaxial outer conductor electrically insulated from the inner conductor. A conductive bus bar extends longitudinally within the outer conductor and is conductively connected thereto. A plurality of gas discharge tubes are directly mounted on the inner conductor along at least a portion of its length in spaced apart intervals. In addition, each of the plurality of gas discharge tubes is conductively connected to a flattened surface on the bus bar through a metal spring washer. In use, the plurality of gas discharge tubes operate in parallel with one another to discharge transient voltages carried by the inner conductor that exceed a predefined threshold.

15 Claims, 4 Drawing Sheets

PROTECTIVE DEVICE FOR A RADIO FREQUENCY TRANSMISSION LINE

CROSS-REFERENCE TO RELATED APPLICATIONS

The present application claims the benefit of U.S. Provisional Patent Application Ser. No. 60/993,431, which was filed on Sep. 12, 2007 in the name of George M. Kauffman.

BACKGROUND OF THE INVENTION

The present invention relates generally to devices for transmitting electromagnetic signals of a desired frequency between a source and a load and more particularly to devices for transmitting electromagnetic signals of a desired frequency between a source and a load that additionally provide over-voltage protection to the transmission line.

A radio frequency (RF) transmission line is a structure that is designed to efficiently transmit high frequency radio frequency (RF) signals between a source and a load. An RF transmission line typically comprises two conductors, such as a pair of metal wires, that are separated by an insulating material with dielectric properties, such as a polymer or air. One type of an RF transmission line which is well known in the art is a coaxial electric device.

Coaxial electric devices, such as coaxial cables, coaxial connectors and coaxial switches, are well known in the art and are widely used to transmit electromagnetic signals over 10 MHz with minimum loss and little or no distortion. As a result, coaxial electric devices are commonly used to transmit and receive signals used in broadcast, military, police, fire, security and civilian transceiver applications as well as numerous other uses.

A coaxial electric device typically comprises an inner signal conductor which serves to transmit the desired communication signal. The inner signal conductor is separated from an outer conductor by an insulating material, or dielectric material, the outer conductor serving as the return path, or ground, for the communication signal. Such an electric device is typically referred to as coaxial because the inner and outer conductors share a common longitudinal axis. It should be noted that the relationship of the geometry of the conductors and the properties of the dielectric materials disposed between the conductors substantially defines the characteristic impedance of the coaxial device.

It has been found that, on occasion, potentially harmful voltages are transmitted through RF transmission lines. In particular, radios operating in either the lower end of the ultra high frequency (UHF) band or lower frequency bands (i.e., below 500 MHz) often utilize longer antenna lengths to enhance performance compared to antennae used in higher frequency applications. In addition, the long range signal propagation characteristics of these lower frequencies allow for superior long range communication. Furthermore, since the mounting height of a radio antenna serves to increase its range, radio antennae are commonly mounted from an elevated position (e.g., a tower or mast). As a result, it has been found that radio antennae are highly susceptible to lightening strikes, the high electrical energy of a lightning strike increasing the likelihood of significant damage to any sensitive components connected to the transmission line, which is highly undesirable.

As a result, at least one RF transmission line component is commonly provided with protective means for deflecting undesirable electromagnetic impulses away from a load connected thereto. As will be described in detail below, a number of different means for protecting an RF transmission line from over-voltage is well-known in the art.

As a first means for protecting an RF transmission line from over-voltage, at least one transmission line component is provided with a device that conducts if the voltage transmitted therethrough exceeds a pre-determined threshold (e.g., a metal oxide varistor (MOV) or similar solid state device), the device in turn being connected directly to ground. Although useful in deflecting undesirable impulses away from a load connected to the transmission line, these types of protective devices carry a relatively high capacitance which in turn limits its operation to relatively low frequencies (i.e., frequencies under 1 MHz).

As a second means for protecting an RF transmission line from over-voltage, at least one transmission line component is provided with a shunt conductor which connects the center conductor to either the outer conductor or ground. The operational frequency of protective devices which utilize shunt conductors is typically greater than 400 MHz because lower frequencies require excessively long shunt conductors. As can be appreciated, the use of excessively long shunt conductors is disfavored, among other reasons, for substantially increasing the overall size of the protective device. An example of a protective device provided with a shunt conductor for grounding undesirable impulses is shown in U.S. Patent Application Publication No. 2004/0169986 to George M. Kauffman, which is hereby incorporated by reference.

As a third means for protecting an RF transmission line from over-voltage, at least one transmission line component is provided with a single gas discharge tube (GDT) that avalanches or conducts transient, high voltage impulses from the center conductor to ground. It should be noted that gas discharge tubes are characterized as having (i) a relatively high transient current capacity, (ii) a compact design and (iii) an inexpensive construction, all of which are highly desirable. For at least these reasons, it has been found that the gas discharge tube is the preferred means in the art for protecting RF transmission lines from over-voltage in components designed to operate at frequencies below 400 MHz.

Although well known in the art, transmission line components which utilize a single gas discharge tube often suffer from a notable drawback. Specifically, it has been found that components which utilize a single gas discharge tube offer a limited lifespan of full functionality. For example, a single heavy duty gas discharge tube can only survive a single impulse of 30 kA. Once the gas discharge tube fails, the protective component requires expensive replacement and/or repair. Otherwise, devices and circuits connected to the transmission line are rendered susceptible to damage from future impulses.

SUMMARY OF THE INVENTION

It is an object of the present invention to provide a new and improved device for transmitting electromagnetic signals of a desired frequency band from a source to a load.

It is another object of the present invention to provide a device as described above which diverts transient voltages which exceed a predefined threshold from the transmission line.

It is yet another object of the present invention to provide a device as described above which has a relatively long lifespan of effectiveness.

It is still another object of the present invention to provide a device as described above which is capable of diverting transient voltages of relatively high value away from the transmission line.

It is yet still another object of the present invention to provide a device as described above that is limited in size, includes a limited number of parts, and is inexpensive to manufacture.

Accordingly, there is provided a device for protecting a radio frequency transmission line from transient voltages, the protective device comprising (a) a first conductor for transmitting electromagnetic signals of a desired frequency, (b) a second conductor spaced apart from the first conductor, the second conductor being grounded, and (c) a plurality of gas discharge tubes coupled in parallel between the first and second conductors, the plurality of gas discharge tubes operating in parallel with one another to discharge transient voltages carried by the first conductor that exceed a predefined threshold.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration particular embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the invention and, together with the description, serve to explain the principles of the invention. In the drawings wherein like reference numerals represent like parts:

FIG. 3(*b*) is an enlarged, exploded, right plan view of the protective device shown in FIG. 3(*a*);

DETAILED DESCRIPTION OF A PREFERRED EMBODIMENT

Construction of Protective Device 11

Figure 1:
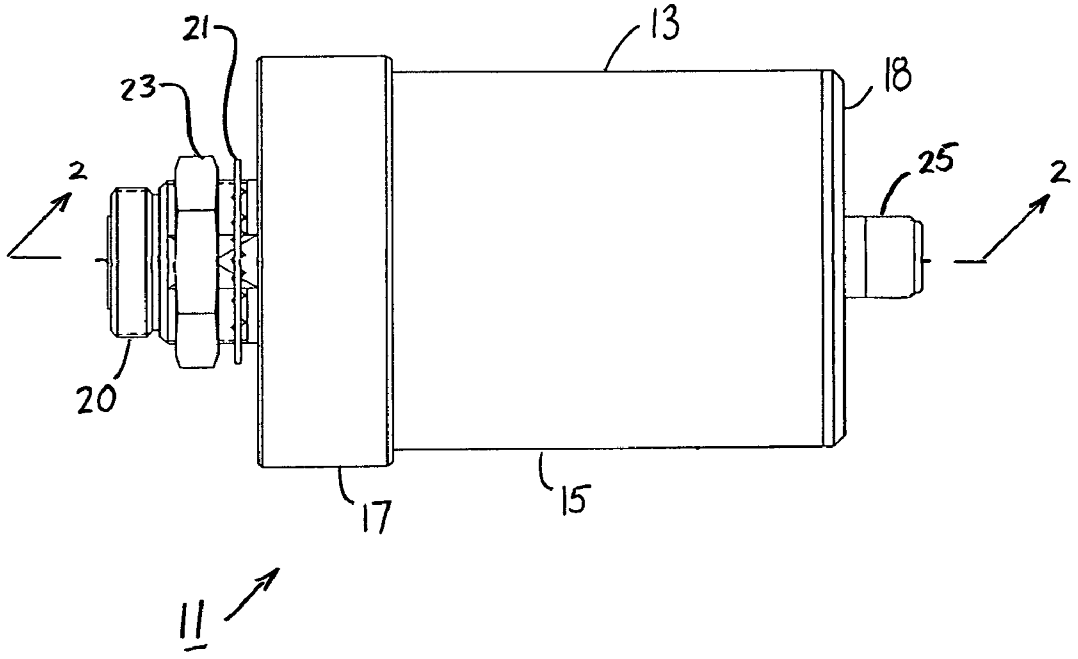
FIG. 1 is a front plan view of a protective device for an RF transmission line, the protective device being constructed according to the teachings of the present invention.
Figure 2:
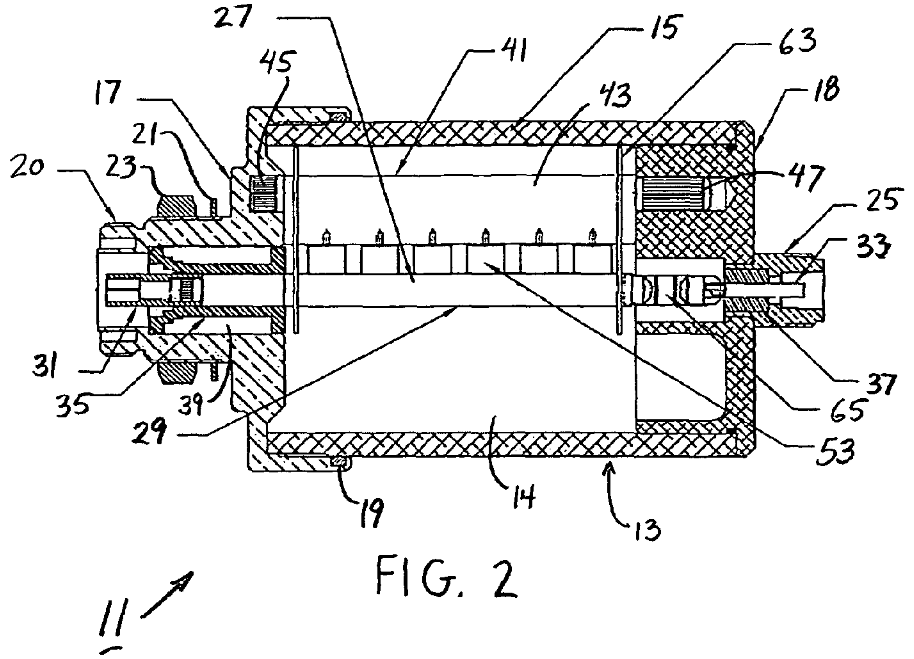
FIG. 2 is a section view of the protective device shown in FIG. 1 taken along lines 2-2, portions of the center conductor, bus bar and the plurality of gas discharge tubes not being shown in section for the purpose of enhanced clarity.

Referring now to FIGS. 1-2, there is shown a protective device for a radio frequency (RF) transmission line that is designed to transmit electromagnetic signals of a desired frequency band between a source and a load, the protective device being constructed according to the teachings of the present invention and represented generally by reference numeral 11. As will be described further below, protective device provides over-voltage protection to the transmission line, thereby precluding potentially harmful voltages from being transmitted to the load.

Protective device 11 comprises an outer conductor 13 that forms the enclosure for protective device 11, outer conductor 13 being shaped to define an enclosed interior cavity 14. Preferably, outer conductor 13 is constructed of a rigid, durable and conductive material, such as aluminum.

As seen most clearly in FIG. 2, outer conductor 13 has an annular shape in lateral cross-section and includes a main body portion, or housing tube, 15, a first end cap 17 threadingly connected to one end of housing tube 15 and a second end cap 18 press fit into the opposite end of housing tube 15.

It is to be understood that outer conductor 13 is not limited to the three-piece construction described herein. Rather, it is to be understood that outer conductor 13 could have an alternative construction (e.g., a single or two-piece construction) without departing from the spirit of the present invention.

The outer surface of housing tube 15 is provided with external threads that are sized and shaped to engage internal threads formed on the inner surface of first end cap 17. Preferably, a seal 19 is provided within the area of contact between main body portion 15 and first end cap 17 to ensure water tight integrity. First end cap 17 includes a free end 20 that at least partially defines a first female connector interface, the interface being threaded on its outer surface to allow for connection to a complementary transmission device. A lock washer 21 and a threaded hex nut 23 are shown mounted onto the outer surface of free end 20 to ensure adequate connectivity between the first female connector interface and the component to which device 11 is connected.

Second end cap 18 is press fit on housing tube 15 in such a manner so as establish an adequate conductivity therebetween. Second end cap 18 is shaped to define a circular opening in which is mounted a ferrule 25 that at least partially defines a second female connector interface, ferrule 25 being sized and shaped to be inserted into and conductively coupled to a complementary device for transmitting electromagnetic signals.

It should be noted that outer conductor 13 is not limited to the connective means shown herein. Rather, it is to be understood that device 11 could be implemented with alternative means of connection (e.g., coaxial cable direct attachment interfaces, printed circuit board launchers or the like) without departing from the spirit of the present invention.

As seen most clearly in FIG. 2, an inner, or center, conductor 27 is disposed along the longitudinal axis of outer conductor 13, inner conductor 27 being spaced apart and isolated from outer conductor 13. Inner conductor 27 is preferably constructed of a copper alloy, such as brass, and extends coaxially along nearly the entire length of outer conductor 13.

It should be noted that protective device 11 is represented herein as being in the form of a coaxial device. However, it is to be understood that protective device 11 is not limited to a coaxial configuration. Rather, it is to be understood that protective device 11 could be in the form of alternative RF signal transmission components without departing from the spirit of the present invention.

Inner conductor 27 comprises a central pin 29 which preferably includes at least one flattened surface, a first female contact 31 secured to one end of central pin 29 by any conventional means (e.g., threaded, press fit and/or solding means) and a second female contact 33 secured to the opposite end of central pin 29 by any conventional means (e.g., threaded, press fit and/or soldering means). In this manner, it is to be understood that together female contact 31 and free end 20 of end cap 17 form a female coaxial connector interface which can be directly connected to a corresponding male interface for the transmission line. Similarly, it is to be understood that together female contact 33 and ferrule 25 form a female coaxial connector interface which can be directly connected to a corresponding male interface for the transmission line.

A first annularly-shaped insulator 35 is mounted onto inner conductor 27 proximate female contact 31. Similarly, a second annularly-shaped insulator 37 is mounted onto inner conductor 27 proximate female contact 33. Together, insulators 35 and 37 serve to mechanically support inner conductor 27 and electrically insulate inner conductor 27 from outer conductor 13, insulators 35 and 37 being constructed of any conventional insulated material, such as Teflon® (PTFE).

It should be noted that insulator 35 has a stepped-shaped configuration at one end. As will be described further below, the characteristic impedance desired for inner conductor 27 can be regulated, at least in part, by modifying the particular configuration of high dielectric constant insulator 35. In the present embodiment, the particular geometry of insulator 35 defines a generally annular air gap 39 between inner conductor 27 and outer conductor 13 to attain a nominal transmission line impedance (usually 50 or 75 ohms), which is highly desirable.

A ground bus bar 41 is located within interior cavity 14 of outer conductor 13 in a spaced apart relationship relative to inner conductor 27, the longitudinal axis of bus bar 41 extending parallel to the longitudinal axis of inner conductor 27. Bus bar 41 is constructed as a unitary, conductive member which includes an elongated central section 43, a first end 45 and a second end 47.

Figure 3A:
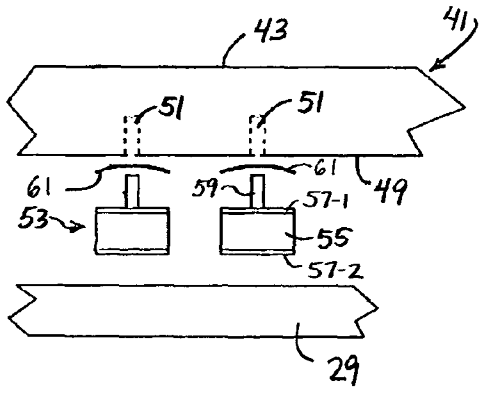
FIG. 3(*a*) is an enlarged, exploded, fragmentary section view of selected components of the protective device shown in FIG. 2.
Figure 3B:
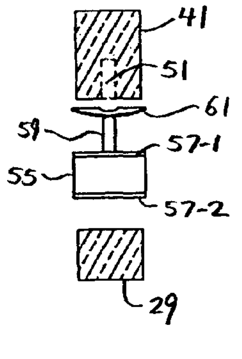

Central section 43 of bus bar 41 is generally rectangular in transverse cross-section and includes a flattened surface 49 which directly faces central pin 29, as seen most clearly in FIG. 3. Flattened surface 49 is shaped to define a plurality of spaced apart receptacles, or holes, 51. As will be described further below, each receptacle 51 is sized and shaped to fittingly receive the lead, or pin, of a corresponding gas discharge tube.

Each of first and second ends 45 and 47 of bus bar 41 is generally circular in transverse cross-section and is preferably knurled about its outer surface. As can be seen in FIG. 2, knurled first end 45 of bus bar 41 is designed to press fit within a corresponding cavity, or hole, formed in the inner surface of first end cap 17, knurled first end 45 frictionally engaging the inner surface of first end cap 17 so as to establish a conductive path therebetween. Similarly, knurled second end 47 of bus bar 41 is designed to press fit within a corresponding cavity, or hole, formed in the inner surface of second end cap 18, knurled second end 47 frictionally engaging the inner surface of second end cap 18 so as to establish a conductive path therebetween. Accordingly, with outer conductor 13 properly grounded, bus bar 41 can be used as a grounding structure for voltage protection devices housed within device 11, as will be described further below.

A plurality of gas discharge tubes 53 are connected in parallel between central pin 29 of inner conductor 27 and bus bar 41. In this manner, a conductive path is established between central pin 29 of inner conductor 27 and bus bar 41 through each gas discharge tube 53. As a result, bus bar 41 can be used to ground potentially harmful transient currents treated by gas discharge tubes, which is highly desirable.

Referring now to FIGS. 3(*a*) and 3(*b*), each gas discharge tube 53 is represented herein as comprising a cylindrical main body 55, first and second disc-shaped electrodes 57-1 and 57-2 mounted on opposing ends of main body 55 and a single axial lead, or pin, 59 which extends orthogonally away from the free surface of electrode 57-1.

It is to be understood that the present invention is not limited to a particular model or type of gas discharge tube. Rather, alternatively constructed gas discharge tubes which are well-known in the art could be used in place of gas discharge tubes 53 without departing from the spirit of the present invention. In addition, it should be noted that additional voltage limiting components may be connected in series with each gas discharge tube to limit follow on current without departing from the spirit of the present invention.

Each gas discharge tube 53 is disposed such that its lead 59 fittingly protrudes into a corresponding receptacle 51 in flattened surface 49 of bus bar 41 to fix the longitudinal position of each gas discharge tube 53 along inner conductor 27. Furthermore, a spring washer 61 constructed of a conductive material is disposed between electrode 57-1 of each gas discharge tube 53 and flattened surface 49 of bus bar 41 and creates a conductive path therebetween. As part of its design, each spring washer 61 continuously urges electrode 57-2 of its corresponding gas discharge tube 53 in continuous contact against central pin 29 so as to maintain the necessary conductive path therebetween.

In the present example, six gas discharge tubes 53 are shown equidistantly mounted along the length of central pin 29. However, it is to be understood that the number of gas discharge tubes 53 could be increased or decreased without departing from the spirit of the present invention. As will be described further below, the number of gas discharge tubes 53 utilized in device 11 is largely dependent upon, among other things, the geometry of selected components in device 11 as well as the performance characteristics of each gas discharge tube 53.

In use, voltages transmitted along inner conductor 27 which fall above a predefined threshold are treated by gas discharge tubes 53 which, in turn, ground said voltages via bus bar 41. As a result, potentially harmful transient voltage surges (e.g., of the type often resulting from lightning strikes) are diverted to ground, thereby protecting the load to which device 11 is coupled, which is highly desirable.

It should be noted that the plurality of gas discharge tubes 53 operate in parallel with one another to shunt transient voltage surges that exceed the predetermined threshold. Most notably, it has been found that the treatment of voltage surges is commonly shared by various combinations of gas discharge tubes 53, the various combinations of gas discharge tubes 53 often alternating, as required, to preserve the lifespan of each gas discharge tube 53. Because the treatment of transient voltages is effectively shared between the plurality of gas discharge tubes 53, the protective lifespan of device 11 is significantly extended, which is a principal object of the present invention.

As seen most clearly in FIG. 2, an optional pair of nonconductive support frames 63 is fixedly secured to the inner housing tube 15 in a spaced apart manner. Preferably, frames 63 serve to retain central pin 29 and bus bar 41 fixed in place within device 11 in response to the displacement force applied to each by the plurality of spring washers 61.

In addition, an optional capacitor 65 is connected in series between central pin 29 and female contact 33 (capacitor 65 being referred to herein as a series capacitive coupling in center conductor 27). As can be appreciated, capacitor 65 provides additional protection to device 11 by further limiting the transmission of transient currents which exit device 11 through the connective interface which is located closer to capacitor 65 (i.e., the female connective interface in FIG. 2).

Method for Regulating Nominal Impedance of Device 11

An RF transmission line is designed to efficiently conduct high frequency electrical energy using both conductive elements (e.g., inner and outer conductors) as well as dielectric elements (e.g., insulators and/or air disposed between the inner and outer conductors). It should be noted that the conductive elements provide an RF transmission line with both (i) a shunt capacitance ($C_S$) and (ii) a longitudinal, or series, inductance ($I_L$), both of which are dependent upon a variety of factors including, but not limited to, the particular geometry of the conductors and the dielectric properties of the elements disposed between the conductors.

Accordingly, it should be noted that the characteristic impedance ($Z_0$) for an RF transmission line can be calculated using the following equation:

$$Z_0=(I_L \text{ per length of transmission line}/C_S \text{ per length of transmission line})^{1/2}$$

For example, a well-known and widely used 0.875 inch trade size coaxial cable with foam polyethylene insulation has a shunt capacitance $C_s$ per length of transmission line value of approximately 23 pF/foot and a longitudinal inductance $I_L$ per length of transmission line value of approximately 58 nH/foot. Using the equation provided above, the characteristic impedance $Z_0$ of the coaxial cable is approximately 50 ohms.

Figure 4:
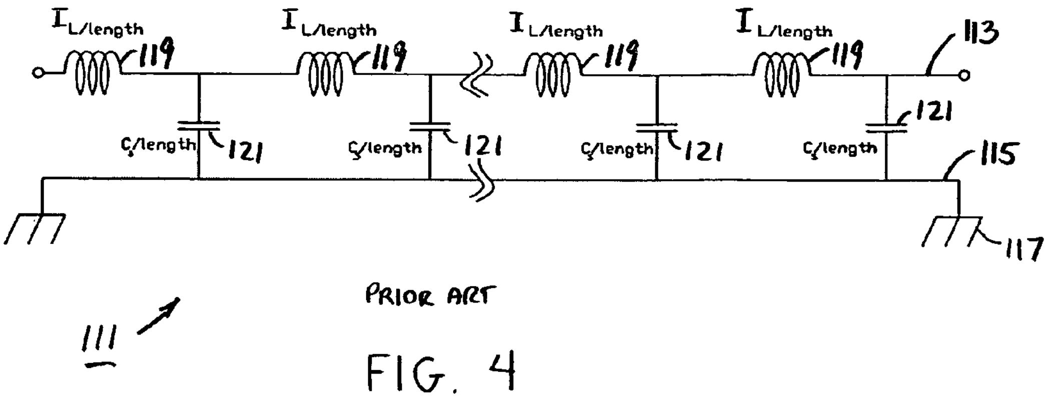
FIG. 4 is a simplified schematic representation of a grounded RF transmission line which is well known in the art.

Referring now to FIG. 4, there is shown a simplified schematic representation of a well known grounded, or unbalanced, RF transmission line, the circuit being identified generally by reference numeral 111. As can be seen, electrical circuit 111 can be represented as comprising inner and outer conductive lines 113 and 115, outer conductive line 115 being connected directly to ground 117. It should be noted that, since an RF transmission line does not have a fixed length, each of inner and outer conductive lines 113 and 115 is provided with break lines to depict the variable nature of the transmission line length.

Inner conductive line 113 is represented herein by a series of inductive elements 119, the value of each inductive element 119 being represented as the series inductance $I_L$ per length of the transmission line. Similarly, circuit 111 is represented as comprising a plurality of capacitive elements 121, with one capacitive element 121 extending from inner conductive line 113, at a location between each successive pair of inductive elements 119, to outer conductive line 115. The value of each capacitive element 121 is represented as the shunt conductance $C_S$ per length of the transmission line.

Figure 5:
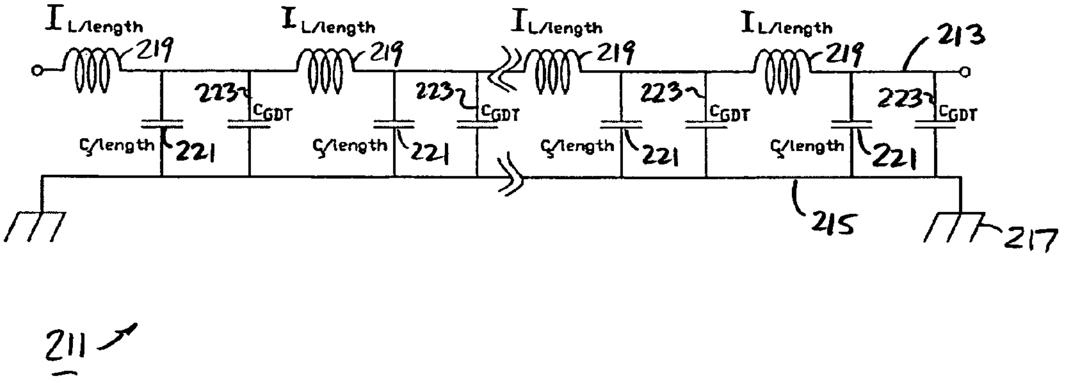
FIG. 5 is a simplified schematic representation of the protective device shown in FIG. 1.

Referring now to FIG. 5, there is shown a simplified schematic representation of device 11, the resultant circuit being identified generally by reference numeral 211. As can be seen, circuit 211 is similar to circuit 111 in that circuit 211 includes inner and outer conductive lines 213 and 215 which are configured similarly to lines 113 and 115. Specifically, inner conductive line 213 is represented as comprising a series of inductive elements 219, the value of each inductive element 219 being represented as the series inductance $I_L$ per length of the transmission line. Similarly, outer conductive line 215 is connected directly to ground 217.

Circuit 211 is also represented as comprising a plurality of primary capacitive elements 221, with one capacitor 221 extending from inner conductive line 213, at a location between each successive pair of inductors 219, to outer conductive line 215. The value of each primary capacitive element 221 is represented as the shunt conductance $C_S$ per length of the transmission line.

However, it should be noted that circuit 211 differs from circuit 111 in that circuit 211 takes into account the capacitance of the plurality of parallel gas discharge tubes 53 into the electrical structure of the transmission line. Specifically, the capacitance of each gas discharge tube 53 is represented in circuit 211 as secondary capacitive element 223, each secondary capacitive element 223 extending in parallel with a corresponding primary capacitive element 221.

As such, it is to be understood that circuit 211 can be used to construct an RF transmission line with a 50 ohm characteristic impedance using approximately one-half of the standard shunt capacitance $C_S$ of circuit 111 by incorporating the capacitance of the plurality of gas discharge tubes 53. Specifically, the RF transmission line could be constructed using a shunt capacitance $C_s$ per length of transmission line value of approximately 12 pF/foot and a standard longitudinal inductance $I_L$ per length of transmission line value of approximately 58 nH/foot. Using the equation provided above, the characteristic impedance $Z_0$ of the coaxial cable is approximately 70 ohms. For a 0.25 foot length transmission line, there is a deficit of approximately 11 pF/foot (i.e., approximately 2.8 pF for the 0.25 foot length) needed to achieve the desired 50 ohm characteristic impedance $Z_0$. Accordingly, in order to add the 2.8 pF required to achieve the desired 50 ohm characteristic impedance, four separate 0.7 pF gas discharge tubes are configured, in parallel, between inner conductive line 213 and outer conductive line 215.

Inherent Benefits Associated with Design of Device 11

An RF transmission line component which includes a plurality of parallel gas discharge tubes (e.g., device 11) inherently experiences a number of rather unexpected property advantages over conventional RF transmission line components (e.g., devices which utilize a single gas discharge tube for over-voltage protection).

As a first advantage, it has been found that an RF transmission line component that includes a plurality of parallel gas discharge tubes is inherently provided with exceptionally high transient current capacity. As can be appreciated, the high transient current capacity is achieved through the use of redundant protective components rather than a single protective component.

As a second advantage, it has been found that an RF transmission line component that includes a plurality of parallel gas discharge tubes experiences a relatively long lifespan. As can be appreciated, the lifespan of the protective device is substantially increased because the plurality of parallel gas discharge tubes operate together in grounding large transient voltages.

Figure 6:
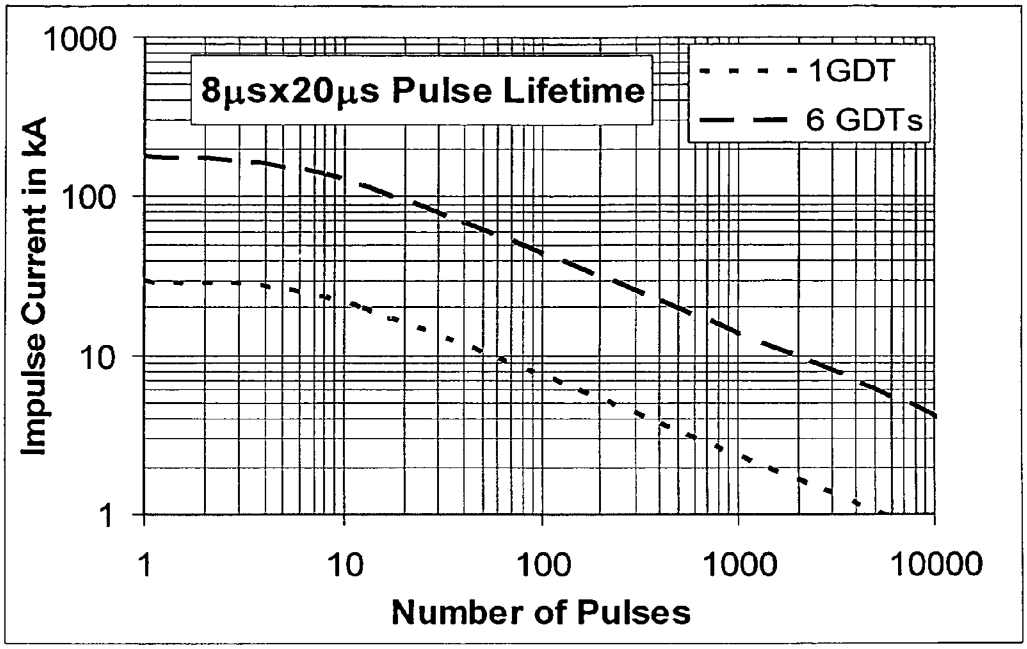
FIG. 6 is a performance chart displaying actually measured data that is useful in quantifying the lifespan increase achieved through the utilization of multiple parallel gas discharge tubes in the protection device of FIG. 1 in comparison with a conventional protection device which utilizes a single gas discharge tube.

Specifically, referring now to FIG. 6, there is shown performance chart of actually measured data that is useful in quantifying the lifespan increase achieved through the utilization of multiple parallel gas discharge tubes. In the chart, the performance of protective device 11 is displayed relative to a conventional protective device which utilizes a single gas discharge tube, the horizontal axis of the chart depicting the number of high transient impulses applied to the RF transmission line and the vertical axis of the chart depicting the current of each high transient impulse. As can be seen, it is clear that a protective device which utilizes six parallel gas discharge tubes (e.g., device 11) is capable of treating a substantially larger quantity of higher current impulses than a protective device which utilizes a single gas discharge tube.

Although not represented in the chart of FIG. 6, actual testing has determined that a protective device which utilizes a single heavy duty GDT can treat only one pulse current of 30 kA. To the contrary, a protective device which utilizes six, parallel heavy duty GDTs (e.g., device 11) can treat approximately two hundred pulse currents of 30 kA, which is an exponential increase in the duration of effective protection, which is highly desirable.

As a third advantage, it has been found that an RF transmission line component that includes a plurality of parallel gas discharge tubes can be easily reconfigured for optimized performance. For example, as noted above, proper transmission line impedance of device 11 can be maintained by reducing the capacitance of the transmission line by the capacitance of the gas discharge tubes. In this manner, the ideal impedance of the transmission line can be readily achieved.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

For example, as noted above, the protective device of the present invention is not limited to use in conjunction with coaxial cables. Rather, it is to be understood that protective device 11 could be implemented into any component of an RF transmission line (e.g., an antenna, amplifier, coupler or the like) without departing from the spirit of the present invention. For instance, protection device 11 could be redesigned as an antenna for an RF transmission line simply by replacing either of contacts 31 and 33 with an aerial.

What is claimed is:

1. A device for protecting a radio frequency transmission line from transient voltages, the protective device comprising:

(a) a first conductor for transmitting electromagnetic signals of a desired frequency, (b) a second conductor spaced apart from the first conductor so as to define an interior cavity therebetween, the second conductor being grounded, and (c) a plurality of gas discharge tubes disposed within the interior cavity and coupled in parallel between the first and second conductors, the plurality of gas discharge tubes being coupled to the first conductor through separate points of contact, the plurality of gas discharge tubes operating in parallel with one another to discharge transient voltages carried by the first conductor that exceed a predefined threshold.

2. The device as claimed in claim 1 wherein each of the plurality of gas discharge tubes is directly mounted on the first conductor in conductive connection therewith.

3. The device as claimed in claim 1 wherein the plurality of gas discharge tubes are coupled to the first conductor at distinct points along at least a portion of its length in a spaced apart intervals.

4. The device as claimed in claim 1 wherein the desired frequency band of the protective device is at least 1 MHz.

5. The device as claimed in claim 1 wherein the first conductor extends coaxially within the second conductor.

6. The device as claimed in claim 1 wherein the first conductor comprises a series capacitive coupling.

7. A device for protecting a radio frequency transmission line from transient voltages, the protective device comprising:

(a) a first conductor for transmitting electromagnetic signals of a desired frequency, (b) a second conductor spaced apart from the first conductor, the second conductor being grounded, (c) a conductive bus bar that is connected to the grounded second conductor, and (d) a plurality of gas discharge tubes coupled in parallel between the first and second conductors, the plurality of gas discharge tubes being directly mounted on the first conductor in conductive connection therewith, each of the plurality of gas discharge tubes being conductively coupled to the bus bar, the plurality of gas discharge tubes operating in parallel with one another to discharge transient voltages carried by the first conductor that exceed a predefined threshold.

8. The device as claimed in claim 7 wherein each of the plurality of gas discharge tubes is conductively connected to the bus bar through a metal spring washer.

9. The device as claimed in claim 7 wherein the second conductor is shaped to define an interior cavity, the bus bar being located entirely within the interior cavity of the second conductor in a spaced apart relationship relative to the first conductor.

10. The device as claimed in claim 9 wherein the longitudinal axis of the conductive bus bar lies in parallel with the longitudinal axis of inner conductor.

11. The device as claimed in claim 7 wherein the conductive bus bar comprises:

(a) a first end connected to the inner surface of the second conductor, (b) a second end connected to the inner surface of the second conductor at a separate location from the first end, and (c) a central section disposed between the first and second ends.

12. The device as claimed in claim 11 wherein the central section of the bus bar includes a flattened surface.

13. The device as claimed in claim 11 wherein the central section of the bus bar is adapted to fittingly receive a portion of each gas discharge tube.

14. The device as claimed in claim 13 wherein the central section of the bus bar is generally rectangular in transverse cross-section.

15. The device as claimed in claim 14 wherein each of the first and second ends of the bus bar is knurled.

* * * * *